United States Patent [19]

Stevenson

[11] 4,375,368
[45] Mar. 1, 1983

[54] METHOD AND APPARATUS FOR AUTOMATIC ADJUSTMENT OF COOLING WIND IN A FOREHEARTH

[75] Inventor: James F. Stevenson, West Hartford, Conn.

[73] Assignee: Emhart Industries, Inc., Farmington, Conn.

[21] Appl. No.: 313,058

[22] Filed: Oct. 19, 1981

[51] Int. Cl.³ .......................... C03B 5/23; C03B 5/24
[52] U.S. Cl. ........................................ 65/29; 65/134; 65/137; 65/161; 65/162
[58] Field of Search ................. 65/161, 162, 137, 134, 65/29

[56] References Cited

U.S. PATENT DOCUMENTS

| | | | |
|---|---|---|---|
| 2,098,625 | 11/1937 | Honiss | 65/162 X |
| 3,010,657 | 11/1961 | Post | 65/162 |
| 3,393,868 | 7/1968 | Griem, Jr. | 65/162 X |

Primary Examiner—Arthur D. Kellogg
Attorney, Agent, or Firm—Gene Warzecha

[57] ABSTRACT

An automatic cooling adjustment system for the forehearth of a glass furnace which enables the minimization of the amount of energy used in the forehearth. The system is utilized in a forehearth wherein a continually activated and adjustable cooling wind apparatus operates in conjunction with an electric or fuel fired heating system which controls or maintains the glass within a desired temperature range and at a predetermined temperature gradient range over the length of the forehearth. An automatic means is provided to adjust the amount of cooling wind and to maintain it at whatever level is required in order to minimize the opposing heating energy required. The system includes a timer which enables small automatic cooling wind adjustments during a first, relatively short time period and which enables temperature stabilization in the forehearth during a second, relatively long time period. The cycle of small adjustments is repeated as necessary to keep the heating system within pre-set energy limits.

10 Claims, 3 Drawing Figures

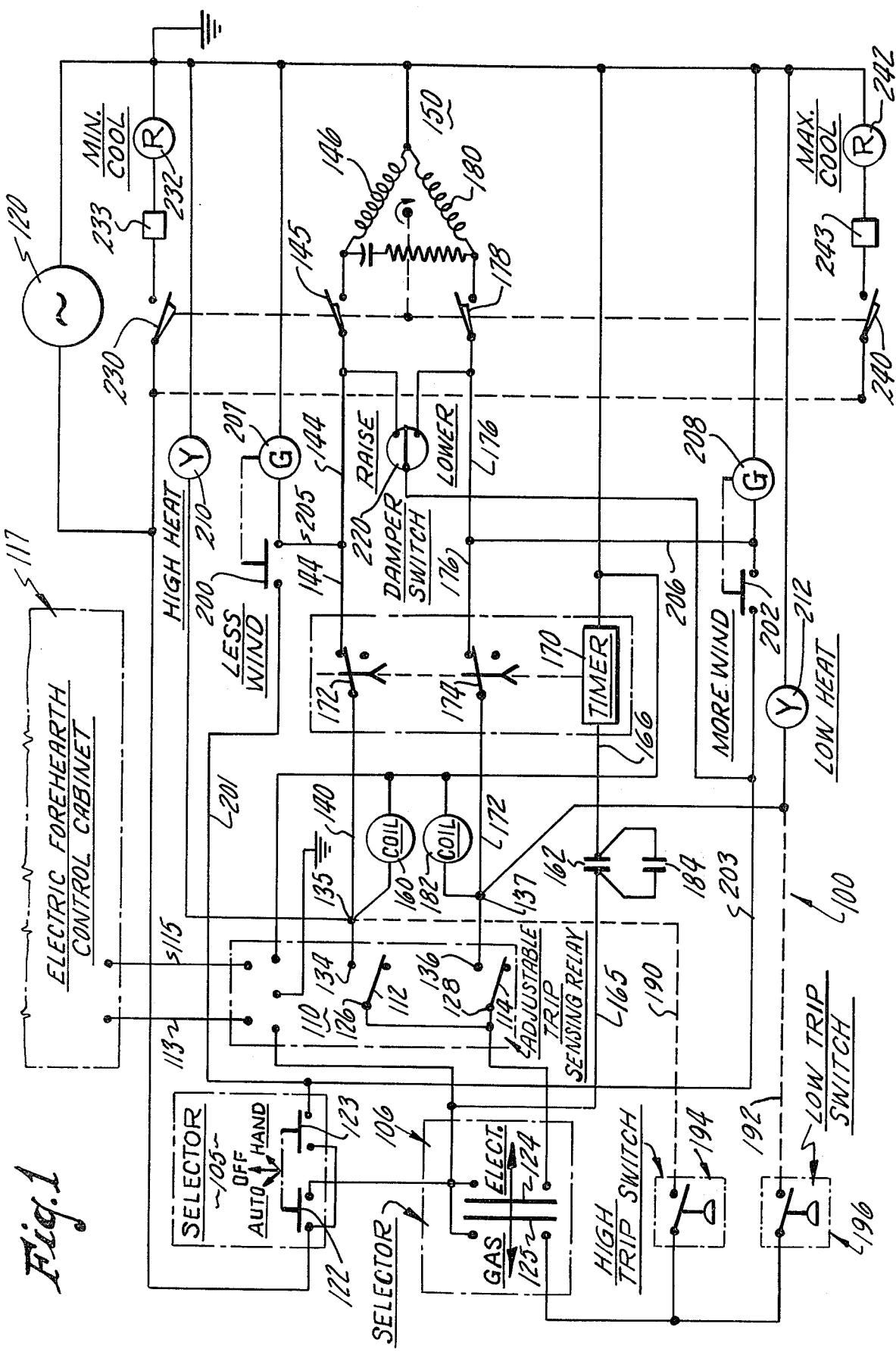

METHOD AND APPARATUS FOR AUTOMATIC ADJUSTMENT OF COOLING WIND IN A FOREHEARTH

BACKGROUND OF THE INVENTION

1. Field of the Invention

The invention relates generally to systems and devices utilized to minimize the amount of energy required in the performance of a particular task. More specifically, the invention relates to apparatus for the minimization of energy required in the forehearth of a glass furnace. Still more specifically, the invention relates to apparatus for automatically adjusting the amount of cooling wind used in a forehearth.

2. Description of Prior Art

The use of cooling wind or other cooling media in glass making devices is well known for reducing the temperature thereof at a predetermined desirable rate. The term "cooling wind" is used herein in the context of glass forehearths to mean atmospheric air which is blown through a distribution network into a forehearth in order to cool the molten glass in the forehearth at a predetermined rate to produce a gradient temperature distribution in the glass over the length of the forehearth.

In order to understand the disadvantages of the prior art and the problems solved by the present invention, a brief discussion of a prior art forehearth cooling adjustment system will be beneficial. Accordingly, referring now to FIG. 2 there is shown a diagrammatic elevational cross section of a cooling zone of a prior art forehearth including a cooling wind distribution system and a manual mechanism for control thereof. The manual adjustment mechanism is, according to the present invention, replaced by the motor and associated components shown in FIG. 3.

The prior art cooling system shown in FIG. 2 includes a ducting network 400 for the distribution of cooling air blown (by means not shown) into inlet 402 and past butterfly inlet control valve 404. Network 400 causes the cooling air to follow the path shown by arrows 406 and 408 into forehearth chamber 410 above the surface of glass 411 which is heated by burners 413. The cooling air then proceeds through flue 412 and past adjustable refractory outlet damper block 414. The amount of cooling wind passing through forehearth chamber 410 is adjustable and is controlled by the opening of inlet control valve 404 as well as by the gap 416 between outlet damper 414 and flue 412. In the prior art system shown, the openings of control valve 404 and gap 416 are controlled by rotation of a threaded manual adjustment rod 420 secured at 422 to the end of damper lever 424. Rod 420 is moved by rotation of hand nut 425 which is prevented from moving vertically by bracket 426. Damper lever 424 is pivotable about fulcrum 427 so that a vertical adjustment downward of rod 420 will cause a corresponding vertical movement upward of block 414. Simultaneously, control valve 404 will be caused to open a greater amount by movement downward of control rod 428 which is secured at point 430 to lever 424 intermediate fulcrum 427 and the point of attachment 422 of rod 420. The extent of the openings and, therefore, the amount of cooling wind is indicated on scale 421.

Those skilled in the art will understand that the cooling wind distribution system shown in FIG. 2 is one of several similar systems which are spaced apart longitudinally along the length of the cooling zone sections of a forehearth. For example, three such systems may be used in one ten foot long cooling zone and each system may have identical or different cooling wind scale settings, as desired by the operator.

It will be understood that glass forehearths known in the prior art generally utilize either electrical elements or gas-fired (or oil-fired) burners to heat the glass as it flows to, for example, a bottle forming machine. Each of these heating means is automatically thermostatically controlled, for example, by a pyrometer, radiation sensor, etc. (not shown), in order to maintain the glass within a desired predetermined temperature range. Furthermore, those skilled in the art will understand that a glass forehearth generally has two or more longitudinally extending cooling zone sections in which the glass temperature is distributed according to a predetermined gradient (or within a small range of gradients). The simultaneous heating and cooling in the forehearth is used to control the temperature gradient as well as the temperature.

Either gas or electric heating means is automatically operable over a predetermined range from minimum to maximum, the minimum setting being generally the least amount of heating energy sufficient to prevent backfiring of the gas-air pressure burners, or allow control using electric heat, and the maximum setting being the greatest amount of heating energy which may be produced by the heating means. The energy level produced by the heating means at any time is automatically controlled within this range by the thermostatic or other similar sensor.

As shown in FIG. 2, cooling wind is used simultaneously with the application of heat to the molten glass. This simultaneous use of cooling and heating in a forehearth makes it desirable to use the lowest practical amount of cooling wind in order to keep the heating energy at its lowest practical level. However, continual changes in incoming glass temperature, ambient temperature, and humidity necessarily require relatively frequent operator adjustments in the amount of cooling wind in order to enable the automatic temperature control to maintain the glass heating system within a desired low range which is generally very narrow.

An understanding of the manner in which an operator generally controls the amount of cooling wind is helpful in order to understand the prior art.

The operator notes the level of energy being used at any particular point in time in order to heat the glass. Since glass is automatically heated to the proper temperature and automatically maintained at the proper temperature gradient, the operator need not be concerned with adjusting the temperature of the glass but, rather, with controlling the level of energy being utilized to maintain that temperature and gradient. As more energy is being utilized as indicated by, for example, kilowatt meters, the operator would decrease the amount of cooling wind as the energy level is increased. An increased energy level is an indication that too much fuel is unnecessarily being used to maintain the proper temperature range and gradient and, since the cooling wind is in constant opposition to the heating energy, a decrease in the cooling wind would enable the heating energy to be more effective. Thus, a decrease in the cooling wind would enable the same temperature range and gradient to be maintained with a lesser amount of fuel.

Similarly, if a low limit of energy is approached, there is a possibility that the temperature range and gradient of the glass will go out of control because the system generally operates in an automatic mode only above a certain minimum energy level. Thus, the operator would not want the energy level to reach this level and in order to prevent this he would increase the amount of cooling air being used. Since the heating energy cannot go below the minimum level (while maintaining control), the cooling wind must be increased in order to cool the glass and thereby require the heating system to expend additional energy and thereby stay slightly above the minimum energy level.

Since cooling wind adjustments are relatively coarse and have a long response time, the operator's general reaction is to not operate the forehearth near the minimum energy limit. If the operator does not operate near the minimum energy limit he must necessarily keep the cooling wind set higher than would otherwise be required to balance the heating energy to maintain it just above the minimum (automatically controlled) energy limit. This higher cooling wind necessarily means more heat is needlessly required to balance against it to maintain proper glass temperature.

This is especially true prior to periods of an operator's absence, such as nights and weekends when he will not be present to monitor energy usage and prevent the low limit from being passed. While this type of excessive cooling wind setting leaves an extra margin for reduction of heating by the automatic temperature control on the forehearth, it wastes a substantial amount of heating fuel unnecessarily and also requires the use of additional fan motor power to blow the cooling wind.

No prior art is known relating to the minimization of energy usage in the forehearth of a glass furnace. However, prior art automatic systems are known for the temperature control of the glass in a forehearth. One such system is disclosed in the U.S. Pat. No. 3,010,657 dated Nov. 28, 1961. The apparatus disclosed in the '657 patent adjusts the cooling wind in response to a sensed temperature, however, it is unsuitable for the minimization of energy usage. Moreover, the apparatus disclosed in the '657 patent uses a single controller to control both heating and cooling and does not take into account the fact that heating and cooling systems have different response times. The '657 apparatus thus creates an instability because it is difficult to balance or continuously adjust simultaneous heating and cooling in a forehearth.

Another temperature control system known in the prior art is disclosed in U.S. Pat. No. 2,658,687 dated Nov. 10, 1953. The '687 apparatus uses timers for controlling the application of cooling water to cooling air in order to maintain the temperature of glass making equipment within a desired operating range. The '687 apparatus is not suitable to control the cooling wind of a forehearths since, inter alia, it only permits positive cooling adjustment in one direction i.e. it only enables the cooling media to be made increasingly colder and relies upon passive heating from the glass making equipment being cooled in order to increase the temperature of the equipment. A cooling wind adjustment system in a forehearth, on the contrary, requires an ability to vary the amount of cooling wind in both directions over a predetermined range in order to compensate for differences in the incoming glass or ambient environment.

One of the disadvantages of prior art forehearth cooling adjustment systems, whether manual or automatic, is their inability to facilitate temperature stabilization within the forehearth. Due to the inherent difference in response time of heating and cooling functions any adjustment system which uses the same controller for controlling the heating and cooling systems will necessarily result in an instability. This makes it difficult to maintain any stable temperature for any reasonable time period and requires constant adjustments of heating and cooling levels.

Furthermore, no prior art system is known which enables automatic forehearth cooling adjustment in order to minimize the amount of energy utilized while still enbling an automatic temperature controller to maintain the material in the forehearth at a predetermined temperature range and gradient.

Accordingly, it is an object of this invention to provide an automatic forehearth cooling adjustment system which does not cause instability of any conventional temperature control system.

It is a further object of this invention to provide an automatic forehearth cooling adjustment system which enables the minimization of energy required to maintain the material in the forehearth at a predetermined temperature and longitudinal gradient.

It is still a further object of this invention to provide an automatic forehearth cooling adjustment system for continually sensing the need for an adjustment in the amount of cooling wind required in order to maintain the temperature of the material in the forehearth accurately controlled by the utilization of as low an amount of energy as practicable.

It is still a further object of this invention to provide an automatic forehearth cooling adjustment system which promptly initiates relatively small changes in the amount of cooling wind as soon as the need for such change is sensed.

It is yet another object of this invention to provide an automatic forehearth cooling adjustment system which enables temperature stabilization within the forehearth during a relatively long period after a change in the amount of cooling wind.

SUMMARY OF THE INVENTION

These and other objects are achieved by the present invention, a preferred embodiment of which is disclosed herein in a cooling wind adjustment system in a forehearth, said system having a distribution network for distributing cooling air into said forehearth, an inlet control valve and an outlet damper for controlling the amount of said cooling air flowing through said forehearth. Said forehearth contains material maintained at a predetermined lengthwise descending temperature gradient by expenditure of a form of energy. The invention is an improvement of said system comprising means for sensing the level of energy used to maintain said material in said forehearth at said predetermined temperature gradient and for producing a first signal when a first predetermined level of said energy is being used and for producing a second signal when a second predetermined level of said energy is being used, said first predetermined level being greater than said second predetermined level. The invention further comprises means for incrementally decreasing the amount of said cooling air in response to said first signal and means for incrementally increasing the amount of said cooling air in response to said second signal.

BRIEF DESCRIPTION OF THE DRAWINGS

A better understanding of the present invention as well as additional objects and advantages thereof will become apparent upon consideration of the detailed disclosure thereof which follows, in conjunction with the following drawings wherein:

FIG. 1 is a schematic diagram of a preferred embodiment of the present invention;

DESCRIPTION OF THE PREFERRED EMBODIMENT

Figure 3:
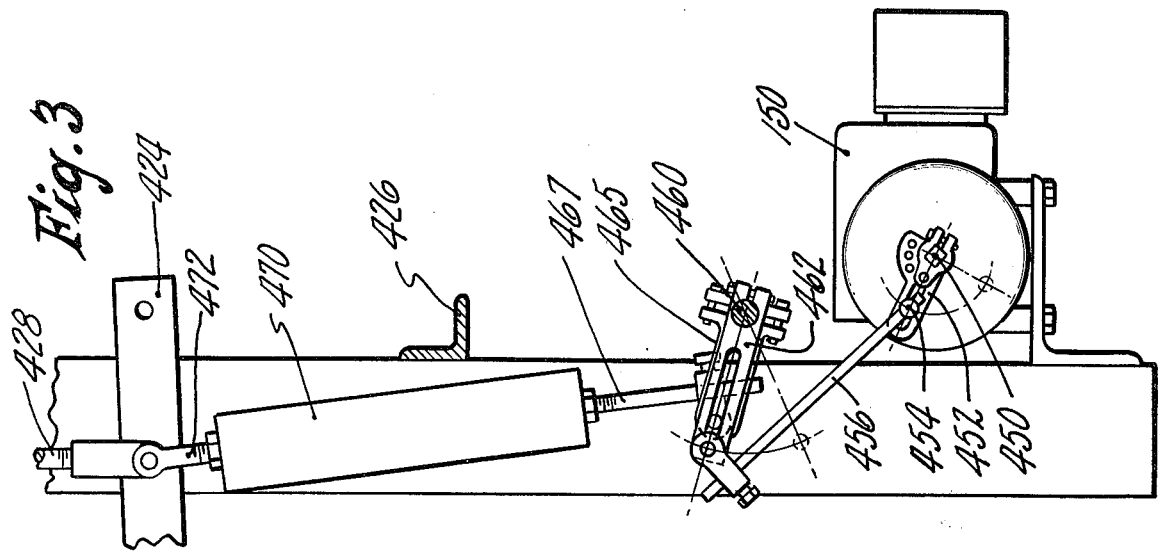
FIG. 3 is an end elevational view of the mechanical layout of the present invention as it may be installed on a forehearth such as that shown in FIG. 2 to automatically activate an existing manual adjustment mechanism.

Referring now to FIG. 1, there is shown a schematic representation of a forehearth cooling adjustment system 100 for use with one or more cooling zones of a forehearth. System 100 includes a selector 105 for enabling an operator to choose either automatic or manual operation, and also includes a selector 106 to enable an operator to set system 100 for operation with either gas-fired or electrically heated forehearths.

System 100 further includes an electrical dual adjustable trip sensing relay 110 for sensing heating power level in the electrical mode which may be selected by switch 124 of selector 106. Module 110 is of conventional design having a high trip switch or relay contact 112 and a low trip switch or relay contact 114 and is intended for operation only in the automatic mode as selected by switch 122 of selector 105 and, as will be seen below, is by-passed if the manual mode is selected by switch 123.

Similarly, system 100 includes gas heating level sensing apparatus in the form of high trip switch 194 and low trip switch 196 for use when gas fired operation is in use as selected by switch 125 of selector 106.

Referring now to the automatic operation of system 100 with an electrically heated forehearth, it will be seen that A.C. control power from a source 120 will be provided through switch 122 to the electrical selector switch 124 of selector 106 and also to terminal 126 of high trip contact 112 and terminal 128 of low trip contact 114.

Adjustable trip sensing relay 110 may be, for example, an Action-Pak Limit Dual Alarm Relay module #AP1020-2004 manufactured by Action Instruments, Inc., 8601 Aero Drive, San Diego, Calif. 92123, having adjustable high and low D.C. voltage sensing trip relays. Module 110 may be operatively connected by lines 113 and 115 to an existing conventional electric forehearth control cabinet 117 to receive a D.C. signal along lines 113 and 115 representative of the level of electrical heating energy being utilized in a cooling zone of the electric forehearth. High and low sensing relay contacts 112 and 114 are adjustable trip relays which produce first and second signals, respectively, by closing in response to the occurrence of predetermined, respectively medium and low or low and slightly higher (hereinafter referred to simply as "high"), levels of electrical power or energy being used to heat the glass in the forehearth.

The terms "high" and "low" are herein used with respect to the trip points and energy levels to indicate relative values only. In operation the "high" energy level is only slightly greater than the "low" level. The points at which contacts 112 and 114 should be set to trip are established within the available electrical power range of the heating system. The low trip point is set a predetermined small amount above the minimum level the heating system can produce, being just enough to maintain automatic temperature control, and the high trip point is set a predetermined larger amount above this minimum level.

Similarly, if a gas fired forehearth is to be automatically adjusted by system 100, high and low sensing switches 194 and 196 may be utilized to trip at selected air-gas mixture pressure (i.e. gas flow) levels and apply electrical power to terminals 135 and 137, respectively. Switches 194 and 196 may, for example, be connected to sense combustion control valve air pressure using "Pressuretrols" #L404F1060, manufactured by Honeywell, or they may be connected to sense air-gas mixture pressure. In the gas mode of operation, limit alarm module 110 is effectively by-passed as shown by phantom lines 190 and 192 so that switches 112 and 114 are replaced by high and low sensing switches 194 and 196.

The selection of either switch 124 or 125 will thus transfer system control to either electrical high and low sensing contacts 112 and 114 or gas high and low sensing switches 194 and 196. Since the operation of the remainder of system 100 is the same in either mode, operation of system 100 will hereinafter be described primarily in terms of the electrical mode.

Contacts 112 and 114 include terminals 134 and 136 respectively to provide power to terminals 135 or 137, respectively, and to remaining components of system 100 as will be hereinafter described. It will be understood by those skilled in the art that only one or the other of contacts 112 or 114 will be closed at any given point in time.

Referring now specifically to the circuit completed by the closure of high sensing contact 112, (or, alternatively, switch 194 for gas) it will be noted that closure of said contact causes electrical power to be transmitted from source 120 via terminal 135, line 140, normally closed time delay switch 142 and line 144 to winding 146 of motor 150. Interposed between time delay switch 142 and winding 146 is a local limit switch 145 on the gear reduced output shaft of the motor, the function of which will be described hereinafter. It will thus be noted that upon closure of switch contacts 122, 124, 112, 142 and 145 a circuit will be completed causing motor 150 to rotate in a predetermined direction depending upon the orientation of winding 146. In one particular embodiment of the invention, winding 146 has been chosen to be that one which causes counterclockwise rotation of motor 150.

Application of power to terminal 135 will also energize relay coil 160 which has contact 162 (shown displaced from coil 160). Upon such energization of relay 160 and consequent closure of contact 162, power will be applied via lines 165 and 166 to timer 170. Thus, it is apparent that motor 150 is activated simultaneously with the activation of timer 170.

Low limit contact 114 (or, alternatively, switch 196) operates analogously to high limit contact 112 and closes a circuit which applies power via lines 172, normally closed time delay switch 174, line 176 and switch 178 to coil 180 of motor 150. Closure of low sensing contact 114 also activates timer 170 via relay coil 182 and relay contact 184. As will be more fully explained below, the distinction between the respective circuits closed by the high and low sensing contacts (or switches) is that the former causes motor 150 to rotate in one direction while the latter causes it to rotate in the opposite direction.

Timer 170 is operatively connected to normally closed time delay switches 142 and 174 in order to open both switches a first predetermined time $T_1$ after activation of timer 170. After opening switches 142 and 174, timer 170 continues to be energized for a second predetermined time $T_2$ during which the switches are held open, thereby preventing the application of power to either winding of motor 150. Upon the expiration of $T_2$, timer 170 resets and repeats its cycle causing switches 142 and 174 to close. If either the high or low heating level as indicated by sensing contacts 112 or 114, respectively, is still exceeded at the expiration of $T_2$, then timer 170 will continue to be activated and switches 142 and 174 will again close and be opened after $T_1$, and held open for $T_2$. When the energy level is brought within the range bounded by the settings of the high and low sensing contacts these contacts will open, the motor will stop and timer 170 will be deactivated and reset. It will be understood that, although time delay switches 142 and 174 are "ganged" together, power will only flow through one of these switches at any point in time, depending upon whether the high or low sensing relay contact is tripped.

One advantage to the particular structure of the invention is that timer 170 is reset as soon as both contacts 112 and 114 are off, which occurs when the energy level being used is within the selected band. Thus, timer 170 may be reactivated sooner then $T_2$ after its previous activation if contacts 112 or 114 indicate the energy level is against outside the desired band and cooling wind adjustment is consequently necessary to bring the energy level back within the band. This enables immediate response by system 100 to energy level changes outside the band.

Rotation of motor 150 will cause a predetermined small incremental change in the amount of the cooling wind flowing through the forehearth. Time $T_1$, is set to be relatively short—in the order of 1 to 2 seconds has been found suitable. The mechanical installation of the invention, while only briefly described below with respect to FIG. 3, is chosen so as to produce very little movement of the outlet damper and inlet control valve by activation of motor 150 during $T_1$. Motor 150 is operated at a very low speed such as, for example, something on the order of ¼ rpm and the mechanical installation produces, for example, full 90° rotation of the control valve in approximately 60 seconds. Thus, activation of motor 150 for 1 second ($T_1$) produces only 1.5° of control valve rotation.

To allow the small incremental change in cooling wind to be responded to by the glass temperature controller prior to initiating any further cooling wind change, it has been found that a time $T_2$ on the order of 20 to 30 minutes is beneficial to enable the heating level to stabilize while holding the temperature (or electrical conductance) in control.

The invention includes means to rapidly change the amount of cooling wind by by-passing the automatic mode of system 100. The operator may select manual operation by closure of switch 123 of selector 105 which by-passes limit contacts 112, 114 and switches 194 and 196 and applies power directly to "less wind" push-button switch 200 and "more wind" push-button switch 202 via lines 201 and 203 respectively. The operator may then manually depress switch 200 to apply power to winding 146 via lines 205, 144 and switch 145. Alternatively, the operator may manually depress switch 202 to apply power to winding 180 via lines 206, 176 and switch 178.

In the manual mode, indicator lights 207 and 208 (labelled "G" for green) become lighted to show manual activation of switches 200 and 202, respectively. In the automatic mode, indicator lights 210 and 212 (labeled "Y" for yellow) become lighted to show activation of either high limit contact 112 (or 194) or low limit contact 114 (or 196), respectively.

System 100 also includes a local damper switch 220 mounted adjacent motor 150 for local manual operation if desired. Switch 220 is enabled only in the manual mode of operation and is also connected to by-pass switches 200 and 202 which may, for example, be mounted on a control panel (not shown) situated remotely from motor 150.

Switch 145 and 178 are limit switches within motor 150 which prevent excessive rotation of the motor in either direction. Switches 145 and 178 are "ganged" to low auxiliary switch 230 and high auxiliary switch 240, respectively, to provide (upon closing) an indication via remotely mounted control panel indicator lights 232 and 242 (labelled "R" for red) that the minimum and maximum cooling limits respectively of system 100 have been reached. Optional alarm activating means at 233 and 243 may provide an audible signal in the event that the limits of motor 150 have been reached.

For convenience, selectors 105 and 106, push-button switches 200 and 202, indicator lights 207, 208, 232 and 242 may all be enclosed in a control unit (not shown) on the operating floor remote from motor 150.

Figure 2:
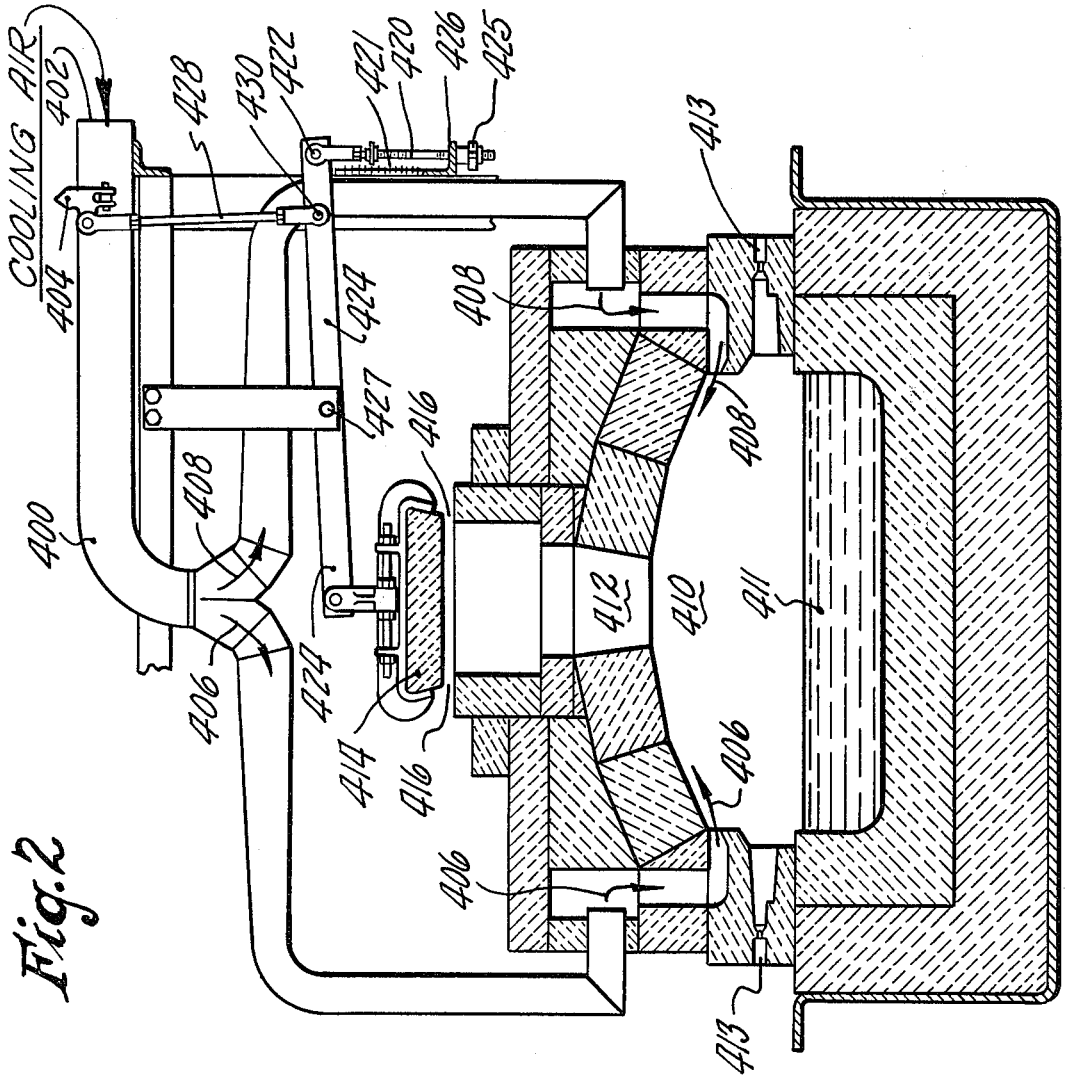
FIG. 2 is a diagrammatic representation of a cross-section of a type of prior art forehearth showing a cooling wind distribution system and manual damper block and control valve adjustment mechanism.

Referring to FIG. 3 for a description of the mechanical installation of the invention there is shown an end view of the installation layout on a prior art forehearth such as shown in FIG. 2. For simplicity, the scale of the mechanical view is enlarged relative to the scale of FIG. 2, although reference to common elements will clarify the relationship of FIGS. 2 and 3. While a side view of these figures is not shown, those skilled in the art will understand that the cooling zone cross-section shown in FIG. 2 is longitudinally extended a predetermined distance and may include several sets of cooling distribution systems (i.e. ducting networks 400, dampers 414 and associated components). The mechanical layout shown in FIG. 3 may control all of such cooling distribution systems simultaneously in any one temperature or heating control zone.

The mechanical installation includes motor 150 the output shaft 450 of which is connected via a radius output arm 452 to a ball joint 454. Ball joint 454 is in turn connected to an adjustable rod 456 which transfers the rotary motion of shaft 450 to a longitudinal operating rod 460 via radius control link 462. Longitudinal operating rod 460, only shown in cross-section FIG. 2, enables one motor 150 to operate a plurality of longitudinally spaced cooling distribution systems as will be understood by those skilled in the art. Each such distribution system is activated from spaced points along operating rod 460 by a control lever 456 (shown behind control link 462) pivotally connected through rod 467, counterweight 470 and rod end 472 to point 430 on damper lever 424. Each counterweight 470 is designed to substantially balance the weight of damper block 414 and associated linkage in order to obviate the necessity of extraordinary heavy linkages and a heavier duty motor.

The angular rotation of motor output shaft 450 is limited to 90° since the range of movement of control valve 404 is similarly limited. The angular rotation of shaft 450 relative link 462 and hence to the control valve is oriented so that as it starts counterclockwise from the position shown, which is the closed valve position, the control valve motion will begin with less rotation compared to shaft rotation and increase relatively toward the open position. This is designed to compensate for the flow characteristic of the butterfly type control valve 404 over its 90° actuation. That is, more change of air flow per degree is thus provided near the closed position.

In actual operation of the invention on a prior art forehearth, the existing manual adjustment mechanism including rod 420 and hand nut 425 need not be totally removed in order to enable automatic operation of system 100. All that merely needs to be done is to remove nut 425 to permit rod 420 to ride freely within bracket 426 as damper lever 424 is moved automatically vertically. Manual operation may thus be easily reinstated if required.

While the invention has been disclosed herein in the context of a forehearth of a glass furnace, it will be understood by those skilled in the art that the invention is suitable for other similar uses where cooling wind may be used simultaneously with heating means for the controlled cooling of material to produce a gradient temperature distribution within the material.

It will be further understood that numerous modifications and improvements may be made to the preferred embodiment of the invention disclosed herein without departing from the spirit and scope thereof.

What is claimed is:

1. In a cooling wind adjustment system in a forehearth, said system having a distribution network for distributing cooling air into said forehearth, an inlet control valve and an outlet damper for controlling the amount of said cooling air flowing through said forehearth, said forehearth containing material maintained at a predetermined lengthwise descending temperature gradient by the input of a form of energy, the improvement comprising:
   first means for sensing the level of energy input to said forehearth;
   second means responsive to said first means for producing a first signal when a first predetermined level of said energy is being used;
   third means responsive to said first means for producing a second signal when a second predetermined level of said energy is being used, said first predetermined level being greater than said second predetermined level; and
   means for incrementally decreasing the amount of said cooling air in response to said first signal and means for incrementally increasing the amount of said cooling air in response to said second signal.

2. An apparatus according to claim 1 wherein said means for increasing and means for decreasing are a reversible motor operatively interconnected with said damper and said control valve to incrementally increase the opening of each during activation of said motor in one direction in response to said first signal and to incrementally decrease the opening of each during activation of said motor in the opposite direction in response to said second signal.

3. An apparatus according to claim 2 further including a timer means for enabling said motor to be activated, in response to either said first or second signal, for a first predetermined time and to be deactivated during a second predetermined time.

4. In a cooling wind adjustment system according to claim 1 wherein said glass is maintained at said predetermined lengthwise descending temperature gradient by an automatic temperature controller responsive to a sensor, the improvement further comprising:
   said first means for sensing the level of energy input being independent of said automatic temperature control sensor and not responsive to the temperature of said glass.

5. In a cooling wind adjustment system in a forehearth, said system having a distribution network for distributing cooling air into said forehearth, an inlet control valve and an outlet damper for controlling the amount of said cooling air flowing through said forehearth, said forehearth containing material maintained within a predetermined temperature range by the input of a form of energy, the improvement comprising:
   first means for sensing the level of said energy input to said forehearth;
   means responsive to said first means for producing a signal when the level of said energy is outside a predetermined energy range;
   first switch means in said sensing means operatively connected to activate a motor upon closure of said switch means;
   second switch means;
   a timer means for controlling the duration of closure of said second switch means, said timer means causing said second switch means to remain closed for a first predetermined time and open for a second predetermined time;
   means for activating said timer means in response to said signal;
   a motor operatively connected to said damper, said control valve, and said first and second switch means for causing said damper and said control valve to move in predetermined directions during activation of said motor, said motor being activated during the closure of said first and second switch means, said motor being deactivated during the time either of said switch means is open, whereupon the amount of said cooling air flowing through said forehearth will change.

6. An apparatus according to claim 5 wherein said signal further comprises a first signal occurring when said input energy level is above said predetermined energy range and a second signal occurring when said input energy level is below said predetermined energy range, and wherein said motor causes said damper and said control valve to move in first and second predetermined directions respectively during activation of said motor in response to said first signal and in opposite third and fourth predetermined directions respectively during activation of said motor in response to said second signal.

7. In a cooling wind adjustment system in a forehearth, said system having a distribution network for distributing cooling air into said forehearth, an inlet control valve and an outlet damper for controlling the amount of said cooling air flowing through said forehearth, said forehearth containing material maintained within a predetermined temperature range by the input of a form of energy, the improvement comprising:

a. a reversible motor operatively interconnected with said damper and said control valve to selectively raise or lower said damper and increase or decrease the opening of said control valve thereby increasing or decreasing the amount of said cooling wind;
  b. means for sensing the level of energy input to said forehearth, said sensing means having a first relay for being tripped upon the occurrence of a predetermined low level of said energy input and for thereby applying power to a first terminal, said sensing means having a second relay for being tripped upon the occurrence of a predetermined higher level of said energy input and for thereby applying power to a second terminal;
  c. a third relay energized by said power at said first terminal;
  d. a fourth relay energized by said power at said second terminal;
  e. a timer activated during the energization of either said third or fourth relay, said timer comprising:
     (i) a first set of normally closed time delay contacts interposed between said first terminal and one terminal of said motor for enabling application of power to said motor to rotate same in a predetermined direction only during the application of power to said one terminal;
     (ii) a second set of normally closed time delay contacts interposed between said second terminal and the other terminal of said motor for enabling application of power to said motor to rotate same in the direction opposite from said predetermined direction during the application of power to said other terminal;
     (iii) said timer for causing said first and second time delay contacts to open a first predetermined time after activation of said timer, said timer subsequently continuing to be activated for a second predetermined time during which said first and second sets of contact are held open;
  f. whereby, upon activation of said timer, said motor will be activated for said first predetermined time to selectively raise or lower said damper and open or close said control valve respectively, depending upon the direction of rotation of said motor, to thereby effect a small incremental change in the amount of said cooling wind during said first predetermined time.

8. An apparatus according to claim 3, 4, 5, 6 or 7 wherein said first predetermined time is shorter than said second predetermined time.

9. A method of minimizing the level of energy input required by a glass forehearth in order to maintain the glass in each zone of said forehearth at a predetermined temperature, said forehearth having a cooling wind distribution system for blowing cooling wind into said forehearth with the temperature controlled by the heating means in said forehearth in order to cause said glass to flow through said forehearth at a predetermined temperature gradient, said method comprising the steps of:

a. continuously sensing the level of said energy input to said forehearth;
  b. producing a first signal in response to the occurrence of a predetermined low level of said energy input;
  c. producing a second signal in response to the occurrence of a predetermined relatively higher level of said energy input;
  d. incrementally increasing the amount of said cooling wind a small, first predetermined amount in response to the ocurrence of said first signal and not enabling any increase in cooling wind amount during a first predetermined time following said first predetermined amount change in order to permit temperature stabilization within said forehearth;
  e. incrementally decreasing the amount of said cooling wind a small, second predetermined amount in response to the ocurrence of said second signal and not enabling any decrease in cooling wind amount during a second predetermined time following said second predetermined amount change in order to permit temperature stabilization within said forehearth;
  f. maintaining a steady amount of cooling wind during the time neither said first nor second signal is produced;
  g. repeating steps a through f.

10. A method of minimizing the level of energy input required by a glass forehearth in order to maintain the glass in each zone of said forehearth at a predetermined temperature, said forehearth having a cooling wind distribution system for blowing cooling wind into said forehearth with the temperature controlled by the heating means in said forehearth in order to cause said glass to flow through said forehearth at a predetermined temperature gradient, said cooling wind distribution system having a reversible motor operatively connected to the inlet control valve and the outlet damper of said cooling wind distribution system to adjust the amount of cooling wind flowing therethrough, said method comprising the steps of:

a. continuously sensing the level of said energy input to said forehearth;
  b. producing a first signal in response to the presence of a predetermined low level of said energy input;
  c. producing a second signal in response to the presence of a predetermined relatively higher level of said energy input;
  d. applying power to said motor to rotate said motor in one direction in response to said first signal or to rotate said motor in the other direction in response to said second signal;
  e. preventing application of power to said motor after a first predetermined time;
  f. blocking application of power to said motor for a second predetermined time, said second predetermined time being longer than said first predetermined time;
  g. enabling application of power to said motor after said second predetermined time upon the presence of either said first or second signal;
  h. repeating steps a through g.

* * * * *